US008832500B2

(12) United States Patent
Nixon et al.

(10) Patent No.: US 8,832,500 B2
(45) Date of Patent: Sep. 9, 2014

(54) MULTIPLE CLOCK DOMAIN TRACING

(75) Inventors: Scott P. Nixon, Fort Collins, CO (US);
Eric M. Rentschler, Windsor, CO (US)

(73) Assignee: Advanced Micro Devices, Inc.,
Sunnyvale, CA (US)

( * ) Notice: Subject to any disclaimer, the term of this patent is extended or adjusted under 35 U.S.C. 154(b) by 174 days.

(21) Appl. No.: 13/572,249

(22) Filed: Aug. 10, 2012

(65) Prior Publication Data

US 2014/0047262 A1    Feb. 13, 2014

(51) Int. Cl.
*G06F 11/00* (2006.01)

(52) U.S. Cl.
USPC .............................................. 714/30; 714/45

(58) Field of Classification Search
CPC ............ G06F 11/3466; G06F 11/3476; G06F 11/3485; G06F 11/349
USPC ............................ 714/30, 31, 39, 45; 712/227
See application file for complete search history.

(56) References Cited

U.S. PATENT DOCUMENTS

| | | |
|---|---|---|
| 3,896,419 A | 7/1975 | Lange et al. |
| 5,210,843 A | 5/1993 | Ayers |
| 5,381,533 A | 1/1995 | Peleg et al. |
| 5,563,594 A | 10/1996 | Ford et al. |
| 5,669,003 A | 9/1997 | Carmean et al. |
| 5,764,885 A | 6/1998 | Sites et al. |
| 5,787,095 A | 7/1998 | Myers et al. |
| 5,881,261 A | 3/1999 | Favor et al. |
| 5,896,528 A | 4/1999 | Katsuno et al. |
| 5,930,497 A | 7/1999 | Cherian et al. |
| 5,944,841 A | 8/1999 | Christie |
| 6,014,742 A | 1/2000 | Krick et al. |
| 6,167,536 A | 12/2000 | Moann |
| 6,185,675 B1 | 2/2001 | Kranich et al. |
| 6,195,744 B1 | 2/2001 | Favor et al. |
| 6,205,508 B1 | 3/2001 | Bailey et al. |

(Continued)

FOREIGN PATENT DOCUMENTS

| | | |
|---|---|---|
| EP | 0 957 428 | 11/1999 |
| GB | 2 381 101 | 4/2003 |

(Continued)

OTHER PUBLICATIONS

ARM Limited; ETM9, Revision: r2p2; Technical Reference Manual; 1999-2002; pp. 1-20; ARM DDI 0157F; ARM Inc., 150 Rose Orchard Way, San Jose, CA 95134-1358, U.S.A.

(Continued)

*Primary Examiner* — Scott Baderman
*Assistant Examiner* — Joseph Kudirka
(74) *Attorney, Agent, or Firm* — Polansky & Associates, P.L.L.C.; Paul J. Polansky

(57) ABSTRACT

An integrated circuit with multiple clock domain tracing capability includes a debug module including a global time stamp counter for counting pulses of a reference clock signal to provide a global time stamp, a first granularity counter for counting pulses of a first clock signal to provide a first granularity count, a second granularity counter for counting pulses of a second clock signal to provide a second granularity count and a trace cache buffer for selectively storing in a first partition the global time stamp, the first granularity count, and first data synchronous to the first clock signal, and for selectively storing in a second partition the global time stamp, the second granularity count, and second data synchronous to the second clock signal.

24 Claims, 4 Drawing Sheets

(56) References Cited

U.S. PATENT DOCUMENTS

| | | | |
|---|---|---|---|
| 6,212,628 B1 | 4/2001 | Abercrombie et al. | |
| 6,216,206 B1 | 4/2001 | Peled et al. | |
| 6,233,678 B1 | 5/2001 | Bala | |
| 6,247,121 B1 | 6/2001 | Akkary et al. | |
| 6,256,727 B1 | 7/2001 | McDonald | |
| 6,256,728 B1 | 7/2001 | Witt et al. | |
| 6,298,394 B1 | 10/2001 | Edwards et al. | |
| 6,311,296 B1 | 10/2001 | Congdon | |
| 6,321,290 B1 | 11/2001 | Yamashita | |
| 6,339,822 B1 | 1/2002 | Miller | |
| 6,345,295 B1 | 2/2002 | Beardsley et al. | |
| 6,357,016 B1 | 3/2002 | Rodgers et al. | |
| 6,449,714 B1 | 9/2002 | Sinharoy | |
| 6,493,821 B1 | 12/2002 | D'Sa et al. | |
| 6,578,128 B1 | 6/2003 | Arsenault et al. | |
| 6,633,838 B1 | 10/2003 | Arimilli et al. | |
| 6,658,519 B1 | 12/2003 | Broberg et al. | |
| 6,732,307 B1 | 5/2004 | Edwards | |
| 6,792,563 B1 | 9/2004 | DesRosier et al. | |
| 6,823,428 B2 | 11/2004 | Rodriguez et al. | |
| 6,834,365 B2 | 12/2004 | Bardsley et al. | |
| 6,839,654 B2 | 1/2005 | Rollig et al. | |
| 6,862,647 B1 | 3/2005 | Hewitt | |
| 6,909,760 B2 | 6/2005 | Borowski et al. | |
| 6,912,673 B1 | 6/2005 | Wyland | |
| 6,973,543 B1 | 12/2005 | Hughes | |
| 7,003,629 B1 | 2/2006 | Alsup | |
| 7,069,176 B2* | 6/2006 | Swaine et al. | 702/176 |
| 7,197,630 B1 | 3/2007 | Alsup | |
| 7,200,776 B2 | 4/2007 | Harris | |
| 7,213,126 B1 | 5/2007 | Smaus et al. | |
| 7,555,633 B1 | 6/2009 | Smaus et al. | |
| 7,873,874 B2 | 1/2011 | Choate et al. | |
| 2002/0095553 A1 | 7/2002 | Mendelson et al. | |
| 2002/0144101 A1 | 10/2002 | Wang et al. | |
| 2003/0023835 A1 | 1/2003 | Kalafatis et al. | |
| 2004/0083352 A1 | 4/2004 | Lee | |
| 2004/0143721 A1 | 7/2004 | Pickett et al. | |
| 2004/0153874 A1 | 8/2004 | Nitsch | |
| 2004/0193857 A1 | 9/2004 | Miller et al. | |
| 2004/0216091 A1 | 10/2004 | Groeschel | |
| 2005/0033553 A1 | 2/2005 | Swaine et al. | |
| 2005/0076180 A1 | 4/2005 | Smaus et al. | |
| 2005/0125613 A1 | 6/2005 | Kim et al. | |
| 2005/0125632 A1 | 6/2005 | Alsup et al. | |
| 2009/0125756 A1 | 5/2009 | Swaine et al. | |
| 2009/0207306 A1 | 8/2009 | Hagg | |
| 2010/0106996 A1 | 4/2010 | Chang et al. | |
| 2010/0281308 A1 | 11/2010 | Xu et al. | |
| 2011/0126051 A1 | 5/2011 | Flautner et al. | |
| 2011/0289302 A1* | 11/2011 | Ubukata et al. | 712/227 |
| 2012/0144240 A1 | 6/2012 | Rentschler et al. | |
| 2012/0324290 A1 | 12/2012 | Chen et al. | |
| 2013/0159780 A1* | 6/2013 | Bedwell et al. | 714/45 |

FOREIGN PATENT DOCUMENTS

| | | |
|---|---|---|
| GB | 2422464 | 6/2005 |
| GB | 2423852 | 9/2006 |
| WO | WO 2005/041024 | 5/2005 |

OTHER PUBLICATIONS

International Searching Authority; International Search Report and Written Opinion for PCT/US2004/039269, mailed Dec. 12, 2005, 11 pages; International Searching Authority, European Patent Office, P. B. 5818 Patentlaan 2, NL-2280 HV Rijswijk.

Yuan Chou and John Paul Shen; "Instruction Path Coprocessors"; Mar. 2000; 24 Pages; Carnegie Mellon University, Department of ECE, Pittsburgh, PA 15213.

Daniel Holmes Friendly, Sanjay Jeram Patel and Yale N. Patt; "Putting the Fill Unit to Work: Dynamic Optimizations for Trace Cache Microprocessors"; Dec. 1998; 9 pages; University of Michigan, Department of Electrical Engineering and Computer Science, Ann Arbor, Michigan 48109-2122.

Bryan Black and John Paul Shen; "Turboscalar: A High Frequency High IPC Microarchitecture"; Jun. 2000; 21 Pages; Carnegie Mellon University, Department of Electrical and Computer Engineering, Pittsburgh, PA 15213.

Matthew C. Merten, Andrew R. Trick, Ronald D. Barnes, Erik M. Nystrom, Christopher N. George, John C. Gyllenhaal and Wen-Mei W. Hwu; "An Architectural Framework for Run-Time Optimization"; Jun. 2001; 43 Pages; Center for Reliable and High-Performance Computing, 1308 West Main Street, MC-228, Urbana, IL 61801.

Stephan Jourdan, Adi Yoaz and Mattan Erez; "Increasing the Instruction-Level Parallelism through Data-Flow Manipulation"; 11 pages; Intel Corporation, Performance Microprocessor Division and Microprocessor Research Lab.

Glenn Hinton, Michael Upton, David J. Sager, Darrell Boggs, Douglas M. Carmean, Patrice Roussel, Terry I. Chappell, Thomas D. Fletcher, Mark S. Milshtein, Milo Sprague, Samie Samaan and Robert Murray; "A 0.18-MUM CMOS IA-32 Processor with a 4-GHz Integer Execution Unit," IEEE Journal of Solid-State Circuits, vol. 36, No. 11, Nov. 2001, pp. 1617-1627.

Sanjay J. Patel and Steven S. Lumetta; "rePLAY: A Hardware Framework for Dynamic Optimization"; IEEE, vol. 50, No. 6, Jun. 2001, pp. 590-608.

Jacobson, Q. and Smith, J.E.; "Instruction Pre-Processing in Trace Processors"; IEEE Xplore, Jan. 1999, 6 pages.

Bryan Black, Bohuslav Rychlik and John Paul Shen; "The Block-Based Trace Cache"; IEEE, 1999, pp. 196-207; Carnegie Mellon University, Department of Electrical and Computer Engineering, Pittsburgh, PA 15213, (Only p. 196 was received.).

Mark Palmer and Stanley B. Zdonik; "Fido: A Cache That Learns to Fetch," Proceedings of the 17th International Conference on Very Large Data Bases, Barcelona, Sep. 1991, pp. 255-264.

Zhifeng Chen, Yuanyuan Zhou and Kai Li; "Eviction Based Cache Placement for Storage Caches," USENIX 2003 Annual Technical Conference, (13 pages).

An-Chow Lai, Cem Fide and Babak Falsafi; "Dead-Block Prediction & Dead-Block Correlating Prefetchers"; 2001 IEEE, 11 pages.

Brian Slechta, David Crowe, Brian Fahs, Michael Fertig, Gregory Muthler, Justin Quek, Francesco Spadini, Sanjay J. Patel and Steven S. Lumetta; "Dynamic Optimization of Micro-Operations"; 2002 IEEE, 12 pages.

Quinn Able Jacobson; "High-Performance Frontends for Trace Processors"; University of Wisconsin-Madison, 1999, pp. 19, 20, 36, 37, 104-122.

Huaxia, Xia; "Using Trace Cache in SMT", Jun. 10, 2001; 8 Pages.

Eric Rotenberg, Steve Bennett and James E. Smith; "Trace Cache: A Low Latency Approach to High Bandwidth Instruction Fetching"; Published in the Proceedings of the 29th Annual International Symposium on Microarchitecture, Dec. 2-4, 1996, pp. 24-35.

Grant Braught; "Class #21—Assemblers, Labels & Pseudo Instructions"; Nov. 16, 2000.

David A. Patterson and John L. Hennessy; "Computer Architecture: A Quantitative Approach", Morgan Kaufmann Publishers, Inc., 2nd Edition, 1996, pp. 271-278.

* cited by examiner

MULTIPLE CLOCK DOMAIN TRACING

Related subject matter is found in a copending patent application entitled "Correlating Traces in a Computing System", U.S. patent application Ser. No. 13/328,512, filed Dec. 16, 2011, by Ryan D. Bedwell et al; and in a copending patent application entitled "Multiple Clock Domain Debug Capability", U.S. patent application Ser. No. 13/587,631, filed Aug. 16, 2012, by Scott P. Nixon et al.

FIELD

This disclosure relates generally to data processors, and more specifically to data processors capable of storing trace data.

BACKGROUND

Consumers continue to demand computer systems with higher performance and lower cost. To address these challenges, integrated circuits are designed as systems on chips ("SoCs") and include an increasing number of modules, such as central processing units ("CPUs"), advanced processing units ("APUs"), graphics processing units ("GPUs"), memory sub-systems, system controllers, and complex peripheral functions. At the same time, gaining visibility into the operation of the system and determining that the system is operating as desired is increasingly difficult. The complexity and cost of finding and eliminating functional "bugs" provide significant challenges. Also, generating, storing, and analyzing the data required to determine if the defects are generally within the system, within a specific module, or between a set of modules present a significant challenge.

Figure 1:
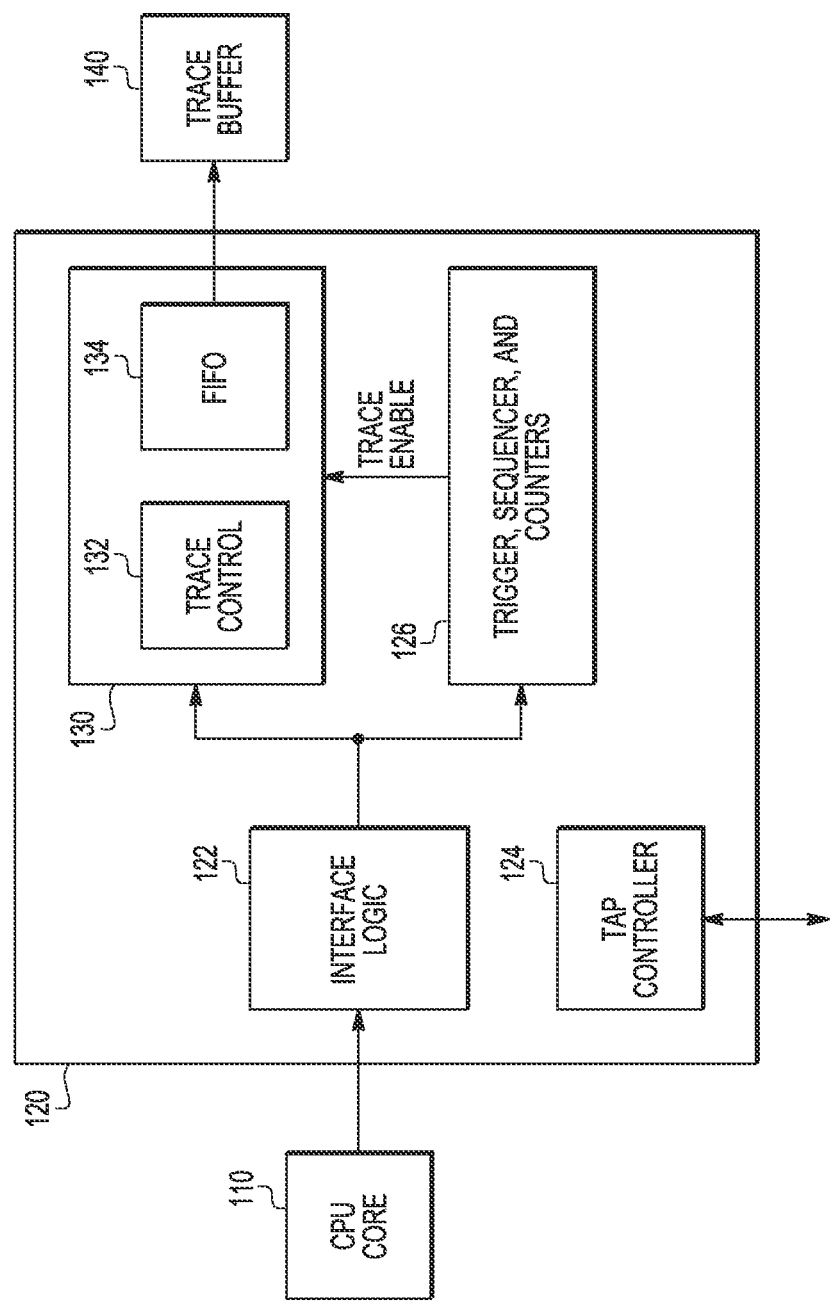
FIG. 1 illustrates in block diagram form a microprocessor with tracing capability known in the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

FIG. 1 illustrates in block diagram form a microprocessor 100 with tracing capability known in the prior art. Microprocessor 100 generally includes a CPU core 110, a trace generation unit 120, and a trace buffer 140. Trace generation unit 120 includes interface logic 122, a test access port ("TAP") controller 124, a functional block 126 labeled "TRIGGER, SEQUENCER, AND COUNTERS", and a trace packet generator 130. Trace packet generator 130 includes a trace control 132 and a first-in, first-out buffer ("FIFO") 134.

CPU core 110 transmits and receives a variety of signals relevant to its operational state that are externally visible, such as addresses, data, control signals, interrupt and exception signals, and the like. Interface logic 122 has an input for receiving selected signals from CPU core 110, and an output. TAP controller 124 has a bidirectional port for transmitting and receiving a set of input and/or output signals, and provides various control signals, not shown in FIG. 1, to configure and control the operation of trace generation unit 120. Functional block 126 has an input connected to the output of interface logic 122, and an output for providing an enable signal labeled "TRACE ENABLE". Trace packet generator 130 has an input connected to the output of interface logic 122, and an output for providing trace packets. Trace buffer 140 has an input connected to the output of trace packet generator 130.

In operation, CPU core 110 executes instructions corresponding to one or more programs. CPU core 110 also provides a debug data stream that includes debug data that is generated by CPU core 110 while executing (or as a result of executing) instructions corresponding to one or more programs.

Trace generation unit 120 handles interfacing and communication with CPU core 110, system test, and starting and stopping the generation of debug records. In particular, interface logic 122 manages communications between the receive circuits and transmit circuits of CPU core 110 and trace generation unit 120. Interface logic 122 provides triggers to functional block 126 and also provides a debug data stream received from CPU CORE 110 to trace packet generator 130.

For certain test standards, such as the Institute of Electrical and Electronic Engineers ("IEEE") standard 1149.1, TAP controller 124 defines a common boundary scan test interface, to support the operation of on-chip and off-chip system testing. For compatible devices, an internal state machine drives the operation of TAP controller 124. Instruction registers define the system-level testing protocol and data registers store the data structures under test by TAP controller 124. TAP controller 124 controls the operation of trace generation unit 120 by providing test clocks for synchronizing the internal state machine, test data input and test data output for exchanging debug data between functional units and system test logic, and a reset signal for initializing the internal state machine of TAP controller 124.

Functional block 126 initiates tracing in response to triggers and controls complex sequences and state changes of tracing operations as defined by certain trigger inputs and the tracing protocol. Also, functional block 126 provides counters for counting events.

Trace packet generator 130 stores information from CPU core 110 in response to an activation of TRACE ENABLE. This information includes values of input/output ("I/O") signals, routing signal values, debug data, and the like. Also trace generation unit 120 stores debug data as a function of a specific configuration and a specific operating mode of CPU core 110.

In particular, trace control 132 generates control signals to manage starting and stopping of trace packet generator 130 and to select the operation protocol of trace packet generator 130. FIFO 134 collects and organizes debug data, by storing the debug data in the order the debug data was received. Likewise, FIFO 134 provides the debug data to trace buffer 140 in the order the debug data was received.

Trace buffer 140 stores the debug data, including data that represents certain activities of CPU core 110, and data that includes other system information gathered during tracing. System resources access trace buffer 140 to analyze the debug data.

Because trace generation unit 120 and trace buffer 140 are dedicated to CPU core 110, they can be located physically close to CPU core 110 on a common integrated circuit die. Trace generation unit 120, trace buffer 140, and CPU core 110 also operate within a single clock domain. In this example they are capable of performing adequate tracing of microprocessor 100. However as the complexity and size of CPU core 110 increase, and microprocessor 100 is expanded to include multiple modules such as other CPUs or sub-portions of a CPU, GPUs, and the like with tracing capability located in remote parts of microprocessor 100 and having their own separate clock domains, trace generation unit 120 becomes insufficient to generate adequate trace data.

Figure 2:
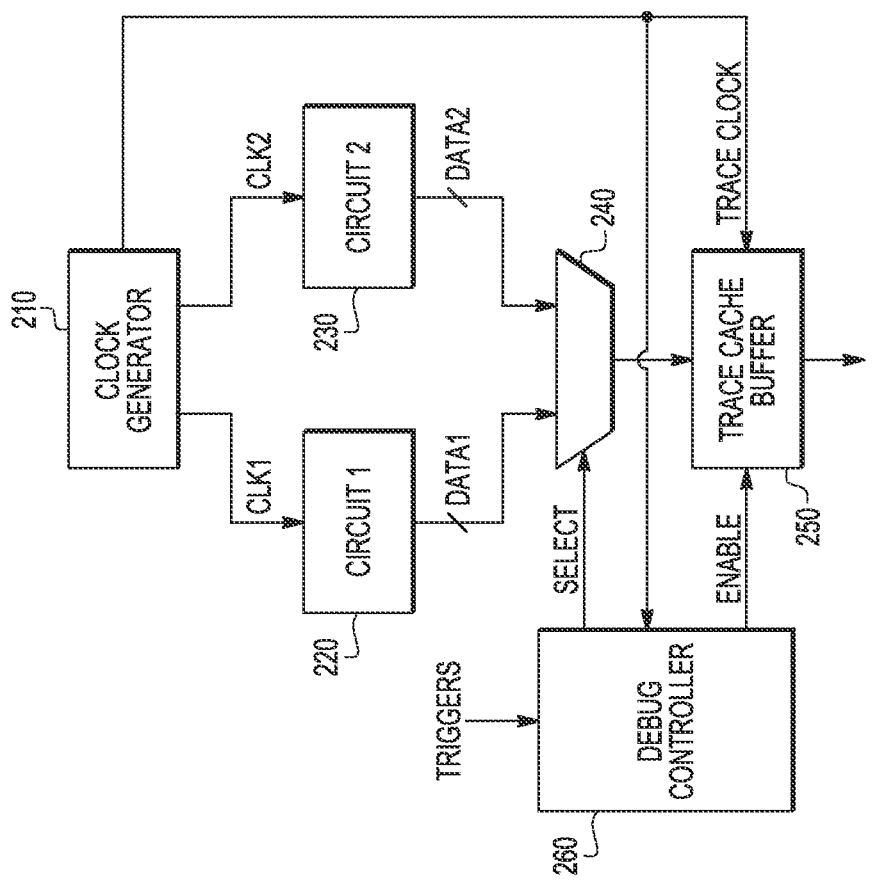
FIG. 2 illustrates in block diagram form a portion of another microprocessor with tracing capability known in the prior art.

FIG. 2 illustrates in block diagram form a portion of another microprocessor 200 with tracing capability known in the prior art. Microprocessor 200 generally includes a clock generator 210, a circuit 220 labeled "CIRCUIT 1", a circuit 230 labeled "CIRCUIT 2", a multiplexor 240, a trace cache buffer 250, and a debug controller 260.

Clock generator 210 has an output connected to an input of circuit 220 for providing a clock signal labeled "CLK1", an output connected to an input of circuit 230 for providing a clock signal labeled "CLK2", and an output connected to an input terminal of trace cache buffer 250 for providing a signal labeled "TRACE CLOCK". Circuit 220 has an output connected to an input of multiplexor 240 over a bus labeled "DATA1". Circuit 230 has an output connected to an input of multiplexor 240 over a bus labeled "DATA2". Multiplexor 240 has an input connected to an output of debug controller 260 for receiving a signal labeled "SELECT" and an output connected to an input of trace cache buffer 250 over a bus. Trace cache buffer 250 has an input connected to an output of debug controller 260 for receiving a signal labeled "ENABLE", an input for receiving the TRACE CLOCK, and an output for providing trace data. Debug controller 260 has an input for receiving a set of signals labeled "TRIGGERS".

In operation, clock generator 210 provides clock signal CLK1 to circuit 220, and clock signal CLK2 to circuit 230. Also, clock generator 210 provides clock signal TRACE CLOCK to trace cache buffer 250 and debug controller 260. Circuit 220 executes local logic functions based on timing edges provided by clock signal CLK1. In response, circuit 220 provides DATA1, where DATA1 includes debug data that reflect results of the activity of circuit 220.

Likewise, circuit 230 executes local logic functions based on timing edges provided by clock signal CLK2. In response, circuit 230 provides DATA2, where DATA2 includes debug data that reflect results of the activity of circuit 230. Circuit 220 and circuit 230 each initiate internal tracing sequences and each circuit controls the state changes of tracing operations as defined by certain trigger inputs and the tracing protocol.

In response to system TRIGGERS, debug controller 260 generates signal ENABLE to manage when trace cache buffer 250 collects trace records. Also, debug controller 260 provides signal SELECT to instruct multiplexor 240 when to provide either DATA1 or DATA2 to trace cache buffer 250.

Trace cache buffer 250 stores debug data, including data that represents certain activities of circuit 220 and circuit 230, such as certain values of input/output ("I/O") signals, routing signal values, debug data values, and the like. Trace cache buffer 250 stores each trace entry synchronous with timing edges provided by the TRACE CLOCK. System resources access trace cache buffer 250 to analyze the debug data.

However, while microprocessor 200 captures traces synchronously with clock signal TRACE CLOCK, data may arrive at the input to trace cache buffer 250 in an unknown phase with respect to its own clock. For smaller, lower speed microprocessors, it may be possible to generate clock signal TRACE CLOCK in a way to ensure that the data is captured properly. However for larger microprocessors, the skew between clock signal CLK1 or clock signal CLK2 and clock signal TRACE CLOCK is unknown, and at certain points in time, trace cache buffer 250 may capture erroneous trace data while it is making a transition. Moreover, trace cache buffer 250 can store data from only one source at a time, whereas information from both circuit 220 and circuit 230 may be relevant to debugging the operation of microprocessor 200.

Figure 3:
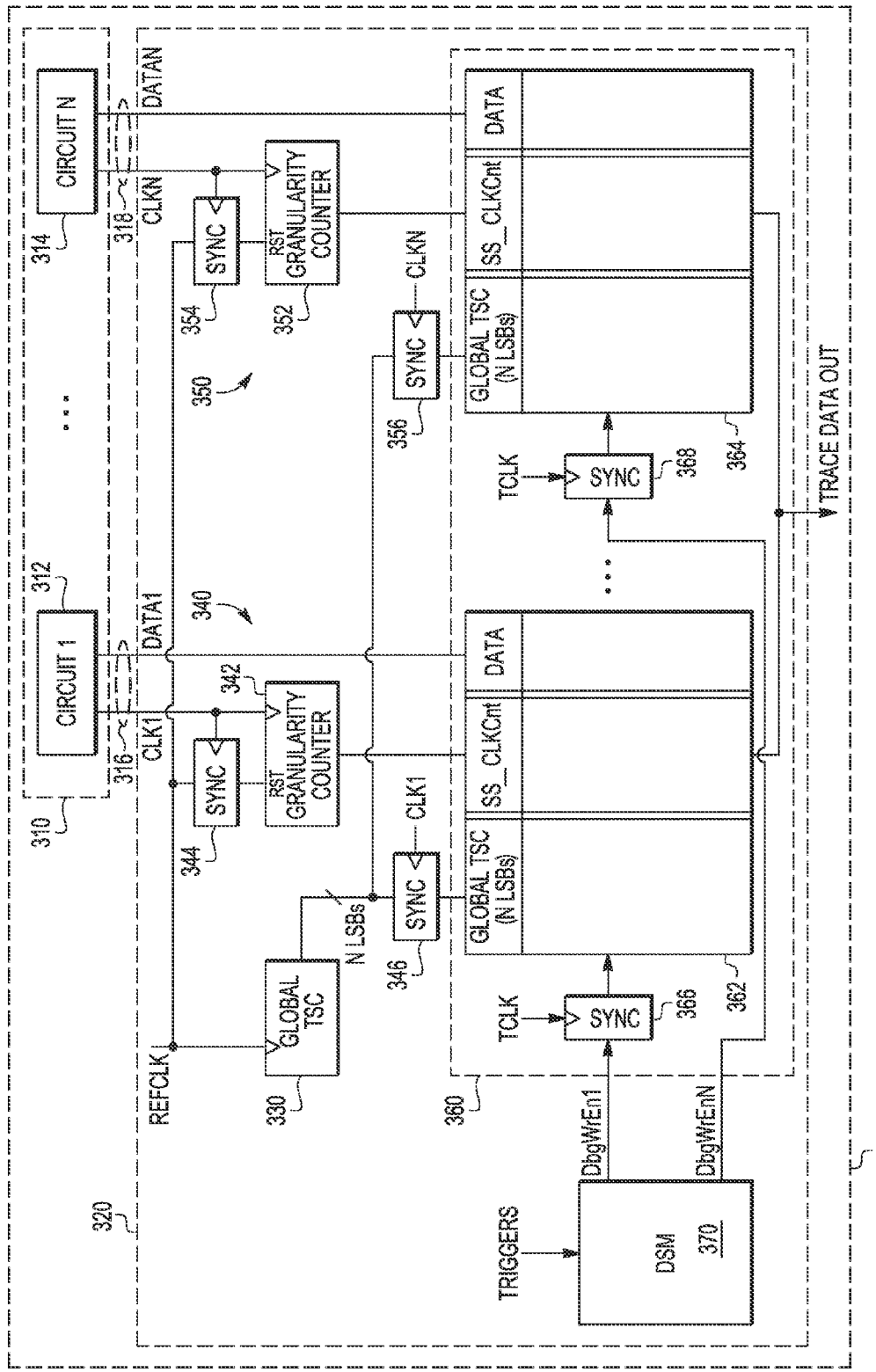
FIG. 3 illustrates in block diagram form an integrated circuit with tracing capability according to some embodiments.

FIG. 3 illustrates in block diagram form an integrated circuit 300 with tracing capability according to some embodiments. Integrated circuit 300 generally includes a functional block 310 and a debug module 320. Functional block 310 includes a circuit 312 labeled "CIRCUIT 1" and a circuit 314 labeled "CIRCUIT 2". Debug module 320 includes a global time stamp counter ("TSC") 330, a functional block 340, a functional block 350, a trace cache buffer 360, and a debug state machine ("DSM") 370. Global TSC 330 has an input for receiving a clock labeled "REFCLK" and an output connected to an input port of a synchronization ("SYNC") latch 346 for conducting a set of least significant bits labeled "N LSBs".

Functional block 340 includes a granularity counter 342, a SYNC latch 344, and a SYNC latch 346. Granularity counter 342 has an input connected to an output of circuit 312 for receiving a signal labeled "CLK1" and an input labeled "RST" connected to an output of SYNC latch 344 for receiving a reset signal. SYNC latch 344 has an input for receiving REFCLK, and an input for receiving CLK1. SYNC latch 346 has an input for receiving CLK1.

Functional block 350 includes a granularity counter 352, a SYNC latch 354, and a SYNC latch 356. Granularity counter 352 has an input connected to an output of circuit 314 for receiving a signal labeled "CLKN" and an input labeled "RST" connected to an output of SYNC latch 354 for receiving a reset signal. SYNC latch 354 has an input for receiving REFCLK, and an input for receiving CLKN. SYNC latch 356 has an input port for receiving the N LSBs of the global time stamp, and an input for receiving CLKN.

Trace cache buffer 360 includes a partition 362, a partition 364, a SYNC latch 366, and a SYNC latch 368. Partition 362 includes a number of storage locations for storing trace records, each having fields labeled "GLOBAL TSC", "SS_CLKCnt", and "DATA". The GLOBAL TSC fields have an input port connected to an output of SYNC latch 346. The SS_CLKCnt fields have an input connected to an output of granularity counter 342. The DATA fields have an input connected to an output of circuit 312 for receiving DATA1. Partition 362 has an output for providing an output labeled "TRACE DATA OUT".

Partition 364 includes a number of storage locations for storing trace records each having fields labeled "GLOBAL TSC", "SS_CLKCnt", and "DATA". The GLOBAL TSC fields have an input connected to an output of SYNC latch 356 over a bus. The SS_CLKCnt fields have an input connected to an output of granularity counter 352. The DATA fields have an input connected to an output of circuit 314 for receiving DATAN. Partition 364 has an input connected to an output of SYNC latch 368 and output for providing TRACE DATA OUT.

SYNC latch 366 has an input connected to an output of DSM 370 for receiving a signal labeled "DbgWrEn1" and an input for receiving a trigger signal labeled "TCLK". SYNC latch 368 has an input connected to an output of DSM 370 for receiving a signal labeled "DbgWrEnN" and an input for receiving TCLK.

In operation, functional block 310 includes a certain number of circuit blocks, such as representative circuits 312 and 314. Each circuit provides a source synchronous data stream. Each one of the source synchronous data streams includes a clock signal and corresponding data. For each one of the source synchronous data streams, a circuit sources the associated clock signal to provide a tight timing reference for the associated data. For integrated circuit 300 each circuit, including circuit 312 and circuit 314, generally sources a clock that is asynchronous to all other source synchronous clocks.

For debug module 320, circuit 312 provides a source synchronous clock CLK1 and associated source synchronous DATA1. Also, circuit 314 provides a source synchronous CLKN, and associated source synchronous DATAN. A global clock source provides a global reference clock REFCLK, and global TSC 330 counts pulses of REFCLK to form a global time stamp including a certain number of least significant bits (N LSBs). REFCLK is lower in frequency than CLK1 or CLKN by a ratio of 1:2 or less.

For functional block 340, granularity counter 342 counts pulses of CLK1 to provide a granularity count to the SS_CLKCnt field of the selected record in partition 362. Also, SYNC latch 344 synchronizes REFCLK with CLK1 to reset granularity counter 342. Since REFCLK is asynchronous to CLK1, SYNC latch 344 provides a stable glitch-free transfer of REFCLK to the RST input of granularity counter 342. During the time period just before SYNC latch 344 resets granularity counter 342, the value in granularity counter 342 is stored as a portion of a trace record in the SS_CLKCnt location of the selected record of partition 362. This trace record portion includes both a coarse, global time stamp and a finer granularity time stamp, to allow better correlation of traces between circuit 312 and circuit 314. SYNC latch 346 synchronizes the N LSBs of global TSC 330 with CLK1 to provide a synchronized global time stamp value. Partition 362 stores this value in location GLOBAL TSC (N LSBs) of the selected record of partition 362.

For functional block 350, granularity counter 352 counts pulses of CLKN to provide a granularity count to location SS_CLKCnt of the selected record of partition 364. Also, SYNC latch 354 synchronizes REFCLK with CLKN to reset granularity counter 352. Since REFCLK is asynchronous to CLKN, SYNC latch 354 provides a stable glitch-free transfer of REFCLK to the RST input of granularity counter 352. During the time period just before SYNC latch 354 resets granularity counter 352, the value in granularity counter 352 is stored as a portion of a trace record in the SS_CLKCnt field of the selected trace record of partition 364. This field represents the relationship between the CLKN clock frequency and the REFCLK clock frequency. SYNC latch 356 synchronizes the N LSBs output of global TSC 330 with CLKN to provide a synchronized global time stamp value. Partition 364 stores this value in the GLOBAL TSC field of the selected record of the selected record of partition 364. Also, trace cache buffer 360 stores DATA1 synchronous with CLK1 in the DATA field in partition 362 and DATAN synchronous with CLKN in the DATA field in partition 364.

DSM 370 provides a central location for the control of tracing and debug operations of integrated circuit 300. Also, DSM 370 enables the storing of a source synchronous data stream, filters the rules that define how trace records are stored, starts and stops clocks that synchronize and store trace records, and provides a system debug mode interrupt based on certain results of the trace records.

To begin the debug process, certain registers store and provide TRIGGERS, or a sequence of TRIGGERS, over a bus to DSM 370. Also, functional blocks such as CPUs, APUs, GPUs, memory sub-systems, system controllers, and complex peripheral functions, provide discrete TRIGGERS, or a sequence of discrete TRIGGERS, to DSM 370. Functional block 310 provides source synchronous data streams to debug module 320 that each represent the operation of circuits within functional block 310, including circuit 312 and circuit 314. DSM 370 responds to selected TRIGGERS by providing selected enabling signals that include "DbgWrEn1" and "DbgWrEnN" to trace cache buffer 360. Enabled by the selected enabling signals, trace cache buffer 360 stores the trace records and provides TRACE DATA OUT to system resources, not shown in FIG. 3.

In particular, DSM 370 provides enable signal DbgWrEn1 to SYNC latch 366. SYNC latch 366 synchronizes Dbg-WrEn1 to clock signal TCLK. SYNC latch 366 further enables storing of an associated trace record, for a given rising edge of CLK1, in the selected location of partition 362. Partition 362 includes separate locations for the synchronized global time stamp, the synchronized granularity count, and the synchronized source synchronous data stream, DATA1. The data record includes a corresponding timestamp value (including both a coarse, global time stamp and a finer granularity local time stamp) to provide correlation of the data in each location to a time value. Likewise, SYNC latch 368 synchronizes DbgWrEnN to TCLK. SYNC latch 368 further enables storing of an associated trace record, for a given rising edge of CLKN, in the corresponding location of partition 364. Partition 364 includes separate locations for the synchronized global time stamp, the synchronized granularity count, and the synchronized source synchronous data stream, DATAN. The record includes a corresponding timestamp value to provide correlation of the data in each location to a time value.

By storing both a coarse, global time stamp and a fine local time stamp, debug module 320 allows the correlation of trace records from multiple circuits even though their own clocks have random phase and frequency with respect to each other. In addition, debug module 320 allows simultaneous storage of multiple trace data streams, which allow more sophisticated debug by storing data from multiple, interrelated functional circuits in response to a single trigger.

Figure 4:
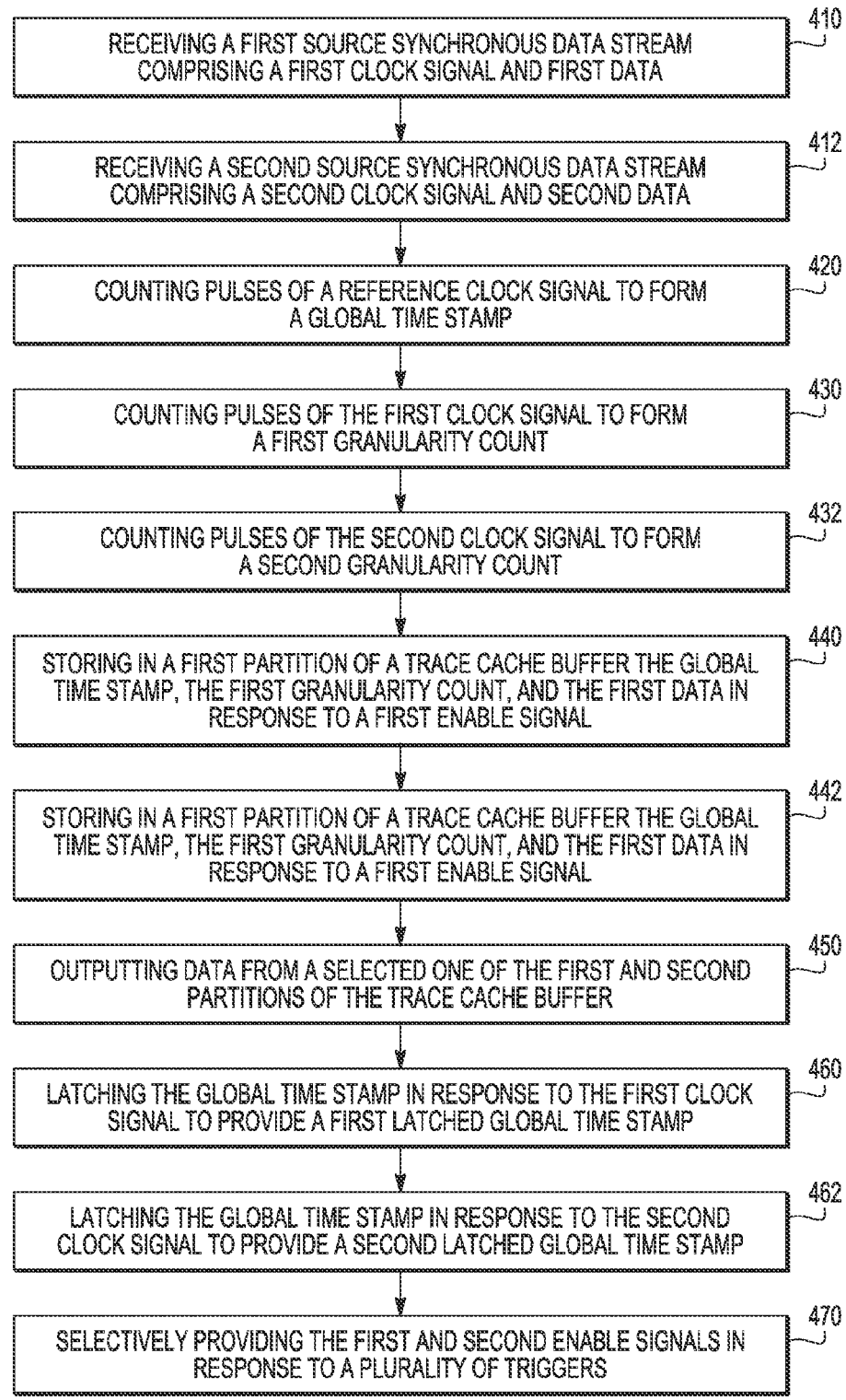
FIG. 4 illustrates a flow chart of a method for tracing according to some embodiments.

FIG. 4 illustrates a flow chart of a method 400 for tracing according to some embodiments. Action box 410 includes receiving a first source synchronous data stream comprising a first clock signal and first data. Action box 412 includes receiving a second source synchronous data stream comprising a second clock signal and second data. Action box 420 includes counting pulses of a reference clock signal to form a global time stamp. Action box 430 includes counting pulses of the first clock signal to form a first granularity count. In some embodiments, this counting includes resetting the first granularity count in response to transitions of the reference clock signal. Action box 432 includes counting pulses of the second clock signal to form a second granularity count. In some embodiments, this counting includes resetting the second granularity count in response to transitions of the reference clock signal. Action box 440 includes storing in a first partition of a trace cache buffer the global time stamp, the first granularity count, and the first data in response to a first enable signal. In some embodiments, this storing includes synchronizing the first enable signal to a third clock signal to provide a synchronized first enable signal, and storing in the first partition of the trace cache buffer the global time stamp, the first granularity count, and the first data in response to the synchronized first enable signal. Action box 442 includes storing in a second partition of the trace cache buffer the global time stamp, the second granularity count, and the second data in response to a second enable signal. In some embodiments, this storing includes synchronizing the second enable signal to the third clock signal to provide a synchronized second enable signal, and storing in the second partition of the trace cache buffer the global time stamp, the second granularity count, and the second data in response to the synchronized second enable signal.

In some embodiments, method 400 further includes an action box 450 including outputting data from a selected one of the first and second partitions of the trace cache buffer, an action box 460 including latching the global time stamp in response to the first clock signal to provide a first latched global time stamp, and/or an action box 470 including selectively providing the first and second enable signals in response to a plurality of triggers. Moreover the actions of method 400 may also be implemented in different orders or in different combinations in various embodiments.

The tracing functions of the integrated circuit of FIG. 3 may be implemented with various combinations of hardware and software, and the software component may be stored in a computer readable storage medium for execution by at least one processor. Moreover the method illustrated in FIG. 4 may also be governed by instructions that are stored in a computer readable storage medium and that are executed by at least one processor. Each of the operations shown in FIG. 4 may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Moreover, integrated circuit 300 may be described or represented by a computer accessible data structure in the form of a database or other data structure which can be read by a program and used, directly or indirectly, to fabricate integrated circuit 300. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising integrated circuit 300. The netlist may then be placed and routed to produce a data set describing geometric shapes to be applied to masks. The masks may then be used in various semiconductor fabrication steps to produce a integrated circuit 300. Alternatively, the database on the computer accessible storage medium may be the netlist (with or without the synthesis library) or the data set, as desired, or Graphic Data System (GDS) II data.

While particular embodiments have been described, modifications to these embodiments will be apparent to those skilled in the art. For example, the traced circuits in functional block 310 can be formed by a variety of elements including a GPU, a CPU core, an APU, a memory sub-system, a system controller (a "north bridge" or a "south bridge"), complex peripheral functions, and so on, and sub-circuits of each of them. Also, in some embodiments, integrated circuit 300 could include a certain number of functional blocks, where a functional block could include a certain set of GPUs, CPU cores, APUs, memory sub-systems, system controllers, complex peripheral functions, and so on. For example, in one embodiment, functional block 310 could include a CPU core, an APU, and a Universal Serial Bus ("USB") controller, and another functional block could include a memory sub-system and a bus arbitration module.

In the illustrated embodiment, functional block 310 of integrated circuit 300 provides CLK1 and CLKN to debug module 320, and the system provides a REFCLK to debug module 320 having a frequency of 1:2 or less with respect to the lowest operating frequency of each of CLK1 and CLKN, but the precise ratio used could vary in different embodiments. Also, CLK1 and CLKN could run at faster or slower frequencies with respect to each other, and could be substantially asynchronous to each other.

In the illustrated embodiment, partition 362 and partition 364 include three separate fields, namely GLOBAL TSC, SS_CLKCnt, and DATA, but any number of fields could be implemented in any number of ways, and any one of these fields could store other selected data using the higher or lower frequency CLK1 or CLKN clocks.

The illustrated embodiment shows SYNC latch 344, SYNC latch 346, SYNC latch 354, and SYNC latch 356, but debug module 320 could bypass one or more of these synchronization latches depending on a particular relationship between CLK1, CLKN, and REFCLK.

Accordingly, it is intended by the appended claims to cover all modifications of the disclosed embodiments that fall within the scope of the disclosed embodiments.

What is claimed is:

1. An integrated circuit with multiple clock domain tracing capability comprising:
    a debug module comprising:
        a global time stamp counter for counting pulses of a reference clock signal to provide a global time stamp;
        a first granularity counter for counting pulses of a first clock signal to provide a first granularity count;
        a second granularity counter for counting pulses of a second clock signal to provide a second granularity count; and
        a trace cache buffer for selectively storing in a first partition said global time stamp, said first granularity count, and first data synchronous to said first clock signal, and for selectively storing in a second partition said global time stamp, said second granularity count, and second data synchronous to said second clock signal.

2. The integrated circuit of claim 1 further comprising:
    a functional block for providing a first source synchronous data stream including said first clock signal and said first data, and a second source synchronous data stream including said second clock signal and said second data.

3. The integrated circuit of claim 1, wherein said debug module further comprises:
    a debug state machine having an input for receiving a plurality of triggers, a first output for providing a first enable signal, and a second output for providing a second enable signal.

4. The integrated circuit of claim 3, wherein said trace cache buffer comprises:
    a first enable latch having a data input for receiving said first enable signal, a clock input for receiving a third clock signal, and an output coupled to a control input of said first partition; and a second enable latch having a data input for receiving said second enable signal, a clock input for receiving said third clock signal, and an output coupled to a control input of said second partition.

5. The integrated circuit of claim 1, wherein:
said first granularity counter includes a data input for receiving said first clock signal, a reset input, and an output for providing said first granularity count; and
said debug module further comprises a first synchronization latch having a data input for receiving said reference clock signal, a clock input for receiving said first clock signal, and an output coupled to said reset input of said first granularity counter.

6. The integrated circuit of claim 5, wherein said debug module further comprises:
a second synchronization latch having a data input coupled to said output of said global time stamp counter, a clock input for receiving said first clock signal, and an output coupled to said trace cache buffer for providing said global time stamp.

7. The integrated circuit of claim 1, wherein said first and second clock signals are characterized as having higher frequencies than a frequency of said reference clock signal.

8. An integrated circuit with multiple clock domain tracing capability comprising:
a functional block for providing a plurality of source synchronous data streams each including a clock signal and data;
a debug module comprising:
a global time stamp counter having an input for receiving a reference clock signal, and an output for providing a global time stamp;
a plurality of granularity counters corresponding to said plurality of source synchronous data streams, each having an input for receiving a corresponding clock signal, and an output for providing a corresponding granularity count; and
a trace cache buffer having a plurality of partitions corresponding to said plurality of source synchronous data streams, wherein in response to one of a plurality of enable signals, said trace cache buffer stores in a corresponding partition said global time stamp, a corresponding granularity count, and corresponding data.

9. The integrated circuit of claim 8, wherein:
said plurality of granularity counters comprises a first granularity counter having a reset input; and
said debug module further comprises a first synchronization latch having a data input for receiving said reference clock signal, a clock input for receiving a first clock signal, and an output coupled to said reset input of said first granularity counter.

10. The integrated circuit of claim 9, wherein said debug module further comprises:
a second synchronization latch having a data input coupled to said output of said global time stamp counter, a clock input for receiving a second clock signal, and an output coupled to said trace cache buffer for providing said global time stamp.

11. The integrated circuit of claim 10, wherein each of said first and second clock signals is characterized as having a higher frequency than a frequency of said reference clock signal.

12. The integrated circuit of claim 8, wherein said debug module further comprises:

a debug state machine having an input for receiving a plurality of triggers, a first output for providing said first enable signal, and a second output for providing said second enable signal.

13. The integrated circuit of claim 12, wherein said trace cache buffer comprises:
a first enable latch having a data input for receiving said first enable signal, a clock input for receiving a third clock signal, and an output coupled to a control input of a first partition; and
a second enable latch having a data input for receiving said second enable signal, a clock input for receiving said third clock signal, and an output coupled to a control input of a second partition.

14. The integrated circuit of claim 8, wherein said functional block comprises a graphics processing unit (GPU).

15. The integrated circuit of claim 8, wherein said functional block comprises a central processing unit (CPU) core.

16. A method comprising:
receiving a first source synchronous data stream comprising a first clock signal and first data;
receiving a second source synchronous data stream comprising a second clock signal and second data;
counting pulses of a reference clock signal to form a global time stamp;
counting pulses of said first clock signal to form a first granularity count;
counting pulses of said second clock signal to form a second granularity count;
storing in a first partition of a trace cache buffer said global time stamp, said first granularity count, and said first data in response to a first enable signal; and
storing in a second partition of said trace cache buffer said global time stamp, said second granularity count, and said second data in response to a second enable signal.

17. The method of claim 16 further comprising:
outputting data from a selected one of said first and second partitions of said trace cache buffer.

18. The method of claim 16 further comprising:
latching said global time stamp in response to said first clock signal to provide a first latched global time stamp,
wherein said storing said global time stamp in said first partition of said trace cache buffer comprises storing said first latched global time stamp in said first partition of said trace cache buffer.

19. The method of claim 18 further comprising:
latching said global time stamp in response to said second clock signal to provide a second latched global time stamp,
wherein said storing said global time stamp in said second partition of said trace cache buffer comprises storing said second latched global time stamp in said second partition of said trace cache buffer.

20. The method of claim 18 wherein said counting pulses of said first clock signal to form said first granularity count comprises:
resetting said first granularity count in response to transitions of said reference clock signal.

21. The method of claim 20 wherein said counting pulses of said second clock signal to form said second granularity count comprises:
resetting said second granularity count in response to transitions of said reference clock signal.

22. The method of claim 16 further comprising:
selectively providing said first and second enable signals in response to a plurality of triggers.

23. The method of claim 16 wherein said storing in said first partition comprises:
- synchronizing said first enable signal to a third clock signal to provide a synchronized first enable signal; and
- storing in said first partition of said trace cache buffer said global time stamp, said first granularity count, and said first data in response to said synchronized first enable signal.

24. The method of claim 23 wherein said storing in said second partition comprises:
- synchronizing said second enable signal to said third clock signal to provide a synchronized second enable signal; and
- storing in said second partition of said trace cache buffer said global time stamp, said second granularity count, and said second data in response to said synchronized second enable signal.

\* \* \* \* \*